A. F. SULZER.
COMPOSITION OF MATTER FOR USE IN FILM MAKING.
APPLICATION FILED MAR. 13, 1922.
1,437,828.                    Patented Dec. 5, 1922.
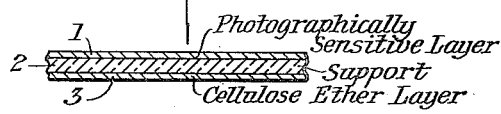
FIG_1_
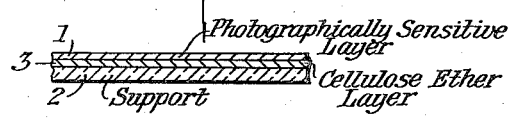
FIG_2_
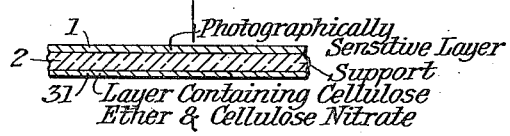
FIG_3_
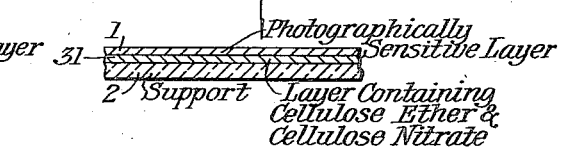
FIG_4_
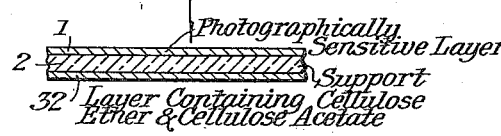
FIG_5_
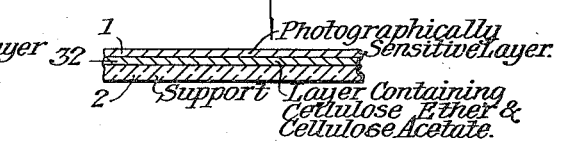
FIG_6_
WITNESS
INVENTOR
Albert F. Sulzer,
BY
ATTORNEY Patented Dec. 5, 1922.

1,437,828

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

COMPOSITION OF MATTER FOR USE IN FILM MAKING.

Original application filed February 4, 1921, Serial No. 446,782. Divided and this application filed March 13, 1922. Serial No. 543,530.

*To all whom it may concern:*

Be it known that I, ALBERT F. SULZER, a citizen of the United States of America, residing at Rochester, in the county of Monroe and State of New York, have invented certain new and useful Improvements in Composition of Matter for Use in Film Making, of which the following is a full, clear, and exact specification.

This invention relates to a composition of matter for use in making film. One object is to provide a suitable composition which may be readily incorporated into the film. Other objects will hereinafter appear.

Due to the manipulation of sensitive photographic film, some times in manufacture, but more frequently in use, characteristic lines or patches may appear on development, because of electrical discharges which are created during the handling. The fog or fog lines which are thus formed on the film are particularly noticeable in the case of the standard species of motion picture film, which includes a nitrocellulose support or base. It is very important from the commercial standpoint to prevent this defect in motion picture art, particularly when making negative film strips. The trouble is commonly referred to as "static" and will be so designated herein.

While certain camera modifications for preventing this electrical trouble have been proposed, it is very desirable to prevent static by a proper constitution of the film, so that the latter may be employed in any commercial camera without any precautions being taken by the user. Of course, the film should likewise be capable of subsequent fluid treatment and drying on the customary racks or apparatus without injury.

I have discovered that film having unexpectedly strong anti-static properties may be prepared by providing the film base with a layer comprising an ether of cellulose. Such ethers may be used alone or combined with other substances, such as cellulose esters, like cellulose nitrate and cellulose acetate.

In the accompanying drawing,—

Fig. 1 shows a section on an exaggerated scale of a film strip embodying the preferred form of my invention;

Figs. 2, 3, 4, 5, and 6 show in section on an exaggerated scale modified forms of the invention.

In the drawing, 2 represents the flexible transparent base or support which may be composed of any of the better known materials, such as nitrocellulose, the usual softeners and modifying agents being present if desired. On this is coated the light sensitive layer 1, which, in the customary form in this art, is a gelatino-silver-haloid emulsion. At 3 is indicated the anti-static coating, which, in the preferred form, is placed upon the back of the support 2, that is, upon the face of the support which is opposite to the sensitive layer 1.

I will now give several examples of various modifications of my invention, but they are purely illustrative and may be widely varied. The proportions are by weight. I may, for example, form the layer of 3, which is usually very thin, out of cellulose ether alone. For instance, I may dissolve 90 parts of ethyl cellulose of the kind that is insoluble in water and is not injuriously softened thereby, in a mixture of chloroform and alcohol of varying proportions, say, for instance, 50 parts of ethyl alcohol and 900 parts of chloroform. This solution may be coated upon the support 2. But in order to insure even greater adhesion of the support and the ether layer, I strongly prefer to add an amount of solvent which will slightly act on the support to cause intimate surface union. Thus to the hereinabove mentioned composition I may add 3000 parts of acetone, at the same time further diluting the mixture with 550 parts of ethyl alcohol. The acetone does not precipitate the ether under these conditions. When the composition containing the alkyl ether of cellulose, a compound solvent for the same, and the acetone and additional alcohol is coated in a thin layer on the back of the film, say one of nitrocellulose, it rapidly dries and adheres to the latter, forming a mechanically integral structure, the volatile ingredients evaporating sufficiently to set the layer and leave a coating or backing which is comprised essentially of cellulose ether.

The coating of ether may be made less expensive if modified to include a cellulose ester, such as cellulose nitrate. A compound coating or layer thus constituted is a very effective anti-static medium. I may first dissolve the ether and ester in their solvents and then combine the two thereafter, adding a proper amount of adhesion-promoting ingredient, together with a diluent that permits its use without precipitation. By way of illustration, 45 parts of ethyl cellulose, of the kind that is insoluble in water and not injuriously softened thereby, may be dissolved in 50 parts of ethyl alcohol and 900 parts of chloroform. Then 45 parts of cellulose nitrate are made into a clear solution with acetone. The ether and nitrate solutions are then homogeneously mixed and finally there is added sufficient acetone to bring the total up to 4000 parts and at the same time sufficient ethyl alcohol is added to the amount, say 550 parts. The resulting dilute solution, when coated on film base, say of the usual nitrocellulose variety, forms a layer comprising essentially an alkyl ether of cellulose and cellulose nitrate which has valuable static preventing qualities and at the same time allows the film to be used in the customary manner throughout the entire motion picture manipulations. In Fig. 3 the photographically sensitive layer is shown at 1 on the intermediate layer or support 2, the latter carrying on its opposite face, as shown at 31, a layer containing cellulose ether and a cellulose ester, such as cellulose nitrate. In Fig. 4 the photographically sensitive layer is shown at 1. It rests directly upon the layer 31 containing cellulose ether and the cellulose ester, such as cellulose nitrate. In back of layer 31 is the support 2.

Instead of cellulose nitrate, cellulose acetate, of the acetone-soluble species, may be substituted for the cellulose nitrate in the formula given in the preceding paragraph. But this species of my invention, in which cellulose ether and cellulose acetate are combined, is not claimed specifically herein, but is covered in my co-pending application filed February 21, 1921, Serial No. 446,783. In Fig. 5 I have shown a photographically sensitive layer 1 resting upon the support 2, the latter having on its opposite face a layer 32 containing cellulose ether and cellulose acetate. In Fig. 6 I have shown the photographically sensitive layer 1 resting directly upon the layer 32 containing the cellulose ether and cellulose acetate, the support 2 being on the opposite face of layer 32.

Cellulose ethers vary in the amount by which they shrink when films containing them pass through the usual photographic baths and are then dried. While I prefer to use those ethers in which this shrinkage is substantially inconsequential, I may, nevertheless, in certain forms of my invention, employ ether prepared in such a way that it has a noticeable tendency to shrink during the photographic treatment. Since this shrinkage occurs at the same time, and from the same causes, as the shrinkage of the gelatino layer 1, it can to a certain extent counteract the latter and thus tend to oppose the curling tendencies in the completed negatives.

While I prefer to have the layer 3 on the rear of the film, as shown in Fig. 1, nevertheless, a useful photographic film may be constituted, as shown in Fig. 2, with the ether containing layer 31 between the support 2 and the sensitive layer 1 carried thereon.

All of the above compositions give transparent, hard, flexible, thin anti-static coatings or layers which are satisfactorily resistant to photographic manipulations and treatment.

This application is a division of my prior application Serial No. 446,782, filed Feb. 21, 1921.

Having thus described my invention, what I claim as new and desire to secure by Letters Patent is:

1. A composition for forming a layer on an object containing a cellulose ester, said composition comprising a cellulose ether, a cellulose ester solvent, and a solvent for said cellulose ether, said last named solvent having a stronger solvent action on said ether than said first named solvent.

2. A composition for forming a layer on an object containing cellulose nitrate, said composition comprising cellulose ether, an amount of nitrocellulose solvent incapable by itself of fully dissolving said ether, and an amount of a solvent of said ether capable by itself of fully dissolving said ether.

3. A composition for forming a layer on an object containing a cellulose ester, said composition comprising an alkyl ether of cellulose, acetone, and a solvent for said ether which is stronger than acetone.

4. A composition for forming a layer on a photographic film support containing a cellulose ester, said composition comprising ethyl cellulose, a cellulose ester solvent, and a solvent for said ethyl cellulose which has a stronger solvent action thereon than said first named solvent.

5. A composition for forming a layer on a nitrocellulose film support, said composition comprising ethyl cellulose, an amount of a nitrocellulose solvent incapable by itself of holding all of said ethyl cellulose in solution, and an amount of a solvent of said ether capable by itself of holding all of said ether in solution.

6. A composition for forming a layer on a photographic film support containing a cellulose ester, said composition comprising ethyl cellulose in a solution of chloroform and ethyl alcohol and acetone.

7. A composition for forming a layer on a photographic film support containing a cellulose ester, said composition comprising an alkyl ether of cellulose and an ester of cellulose in solution together in a mixture containing a solvent of the cellulose ether which is by itself substantially a non-solvent of the ester and containing a solvent of the ester that is alone substantially a non-solvent of the ether.

8. A composition for forming a layer on a photographic film support containing cellulose nitrate, said composition comprising ethyl cellulose and cellulose nitrate in solution together in a mixture containing a solvent of the ether that is alone substantially a non-solvent of the nitrate and a solvent of the nitrate that is alone substantially a non-solvent of the ether.

9. A composition for forming a layer on a photographic film support containing cellulose nitrate, said composition comprising ethyl cellulose and cellulose nitrate dissolved in a mixture containing chloroform, alcohol and acetone.

10. A composition for forming a layer on a photographic film support containing cellulose nitrate, said composition comprising an alkyl ether of cellulose and a cellulose ester in solution in a mixture of chloroform, alcohol and acetone.

11. The process of compounding a composition, which comprises dissolving an ether of cellulose in a solvent that is alone substantially a non-solvent of a cellulose ester, separately dissolving said ester in a solvent that alone is substantially a non-solvent of said ether, and then combining the two solutions.

12. The process of compounding a composition of matter, which comprises dissolving a cellulose ether in a solvent that alone is substantially a non-solvent of a cellulose ester, separately dissolving said ester in a solvent that alone is substantially a non-solvent of said ether, combining the two solutions thus formed, and finally diluting the combination with a mixture of solvents used in forming said solutions.

Signed at Rochester, New York, this 8th day of March 1922.

ALBERT F. SULZER.